US012674653B2

(12) United States Patent
Yamaji

(10) Patent No.: US 12,674,653 B2
(45) Date of Patent: Jul. 7, 2026

(54) AUTOMATIC MEASURING APPARATUS AND CONTROL METHOD FOR THE SAME

(71) Applicant: MITUTOYO CORPORATION, Kanagawa (JP)

(72) Inventor: Masashi Yamaji, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 344 days.

(21) Appl. No.: 18/431,195

(22) Filed: Feb. 2, 2024

(65) Prior Publication Data

US 2024/0263932 A1    Aug. 8, 2024

(30) Foreign Application Priority Data

Feb. 8, 2023    (JP) ................................. 2023-017945

(51) Int. Cl.
G01B 5/02 (2006.01)

(52) U.S. Cl.
CPC ....................................... G01B 5/02 (2013.01)

(58) Field of Classification Search
CPC . G01B 3/18; G01B 21/00; G01B 5/02; G01B 5/0002; G01B 5/00; G01B 5/06; G01B 7/002; G01B 7/02; G01B 7/04; G01B 7/048
USPC .................. 33/813, 815, 831, 828, 556, 559
See application file for complete search history.

(56) References Cited

U.S. PATENT DOCUMENTS

| | | | | | |
|---|---|---|---|---|---|
| 5,934,865 | A * | 8/1999 | Meadows | ........... | H10P 72/7602 294/93 |
| 7,146,620 | B2 * | 12/2006 | Klein | ..................... | G11B 23/00 369/30.55 |
| 10,283,922 | B2 * | 5/2019 | Niwano | ............... | H01R 13/701 |
| 11,466,971 | B2 * | 10/2022 | Yamaji | ..................... | G01B 5/02 |
| 12,451,761 | B2 * | 10/2025 | Medrano | .................. | H02K 5/04 |
| 2021/0372762 | A1 * | 12/2021 | Yamaji | .................. | G01B 3/008 |

(Continued)

FOREIGN PATENT DOCUMENTS

| | | | | | |
|---|---|---|---|---|---|
| CN | 118456459 A | * | 8/2024 | ............... | B25H 1/10 |
| DE | 102024103395 A1 | * | 8/2024 | ............... | B25H 1/10 |
| JP | 8-14871 | | 1/1996 | | |

(Continued)

OTHER PUBLICATIONS

Yamaji (Year: 2024).*
Ishikawa (Year: 2019).*

*Primary Examiner* — Peter J Macchiarolo

(74) *Attorney, Agent, or Firm* — Greenblum & Bernstein, P.L.C.

(57)    ABSTRACT

An automatic measuring apparatus includes a measuring device that measures a workpiece dimension by a movable element, an automatic operation part that automates the forward/backward movement of the movable element by power, and a workpiece holding part that holds the workpiece. The workpiece holding part includes a holding shaft having a length in a direction along a direction of the forward/backward movement of the movable element and holds the workpiece in such a manner the workpiece is suspended on the holding shaft while the holding shaft is inserted in a hole in the workpiece. The workpiece holding part allows the workpiece to move in parallel along the holding shaft to change a position of the workpiece and to rotate to change a posture of the workpiece when the movable element is brought into contact with the workpiece.

7 Claims, 16 Drawing Sheets

(56)     References Cited

U.S. PATENT DOCUMENTS

| 2024/0035816 A1* | 2/2024 | Ogawa | G01B 3/18 |
| 2024/0102784 A1* | 3/2024 | Nahum | G06T 7/13 |
| 2024/0151506 A1* | 5/2024 | Takatsu | B25J 9/1679 |
| 2024/0263932 A1* | 8/2024 | Yamaji | G01B 5/02 |
| 2024/0383157 A1* | 11/2024 | Nagafuchi | B25J 11/0095 |

FOREIGN PATENT DOCUMENTS

| JP | 10-89903 | | 4/1998 | | |
| JP | 2019-100904 | | 6/2019 | | |
| JP | 2019100904 A | * | 6/2019 | | B25J 9/0093 |
| JP | 2024112707 A | * | 8/2024 | | B25H 1/10 |

* cited by examiner (SECOND EXEMPLARY EMBODIMENT)

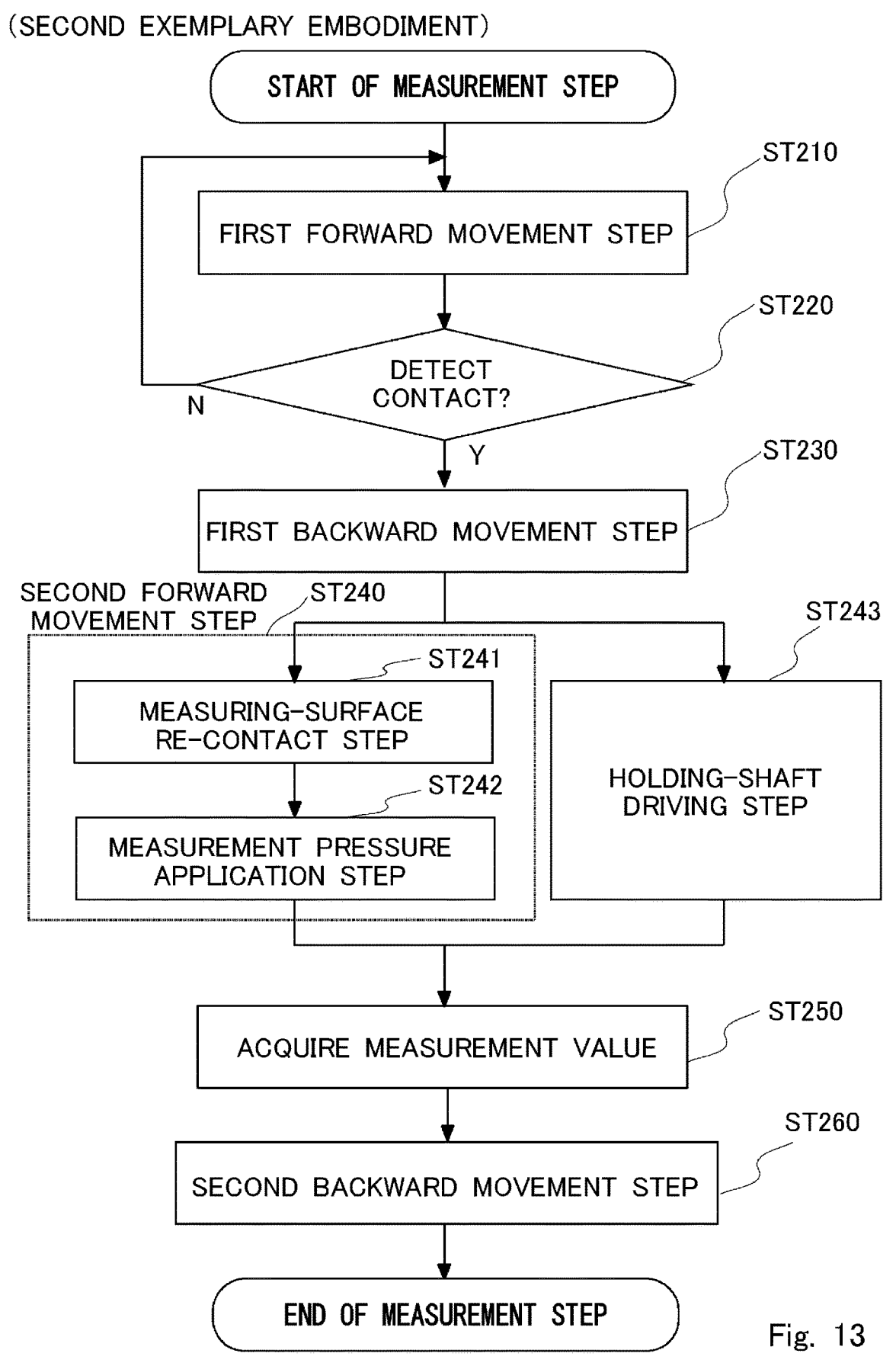

(SECOND EXEMPLARY EMBODIMENT)

```
              ┌─────────────────────────────────┐
              │   START OF MEASUREMENT STEP      │
              └─────────────────────────────────┘
                             │
        ┌────────────────────▼────────────────────┐
        │                                          │      ST210
        │      FIRST  FORWARD  MOVEMENT  STEP       │
        │                                          │
        └──────────────────┬───────────────────────┘
                           │
                           ▼
                    ╱───────────────╲                     ST220
          N        ╱     DETECT        ╲
     ◄────────────┤     CONTACT?        ├
                   ╲                   ╱
                    ╲─────────────────╱
                           │ Y
                           ▼
        ┌──────────────────────────────────────────┐     ST230
        │     FIRST  BACKWARD  MOVEMENT  STEP        │
        └──────────────────┬───────────────────────┘
```

SECOND FORWARD        ST240                                    ST243
MOVEMENT STEP

```
  ┌ ─ ─ ─ ─ ─ ─ ─ ─ ─ ─ ─ ─ ─ ─ ─ ┐
  │  ┌──────────────────────┐ ST241│   ┌────────────────────┐
  │  │  MEASURING-SURFACE    │      │   │                    │
  │  │  RE-CONTACT STEP      │      │   │                    │
  │  └──────────┬───────────┘      │   │  HOLDING-SHAFT      │
  │             │             ST242 │   │  DRIVING STEP       │
  │  ┌──────────▼───────────┐      │   │                    │
  │  │ MEASUREMENT PRESSURE  │      │   │                    │
  │  │ APPLICATION STEP      │      │   └────────────────────┘
  │  └──────────────────────┘      │
  └ ─ ─ ─ ─ ─ ─ ─ ─ ─ ─ ─ ─ ─ ─ ─ ┘
```

```
        ┌──────────────────────────────────────────┐     ST250
        │      ACQUIRE  MEASUREMENT  VALUE           │
        └──────────────────┬───────────────────────┘
                           │
        ┌──────────────────▼───────────────────────┐     ST260
        │     SECOND  BACKWARD  MOVEMENT  STEP       │
        └──────────────────┬───────────────────────┘
                           │
              ┌────────────▼──────────────────┐
              │    END  OF  MEASUREMENT  STEP   │
              └───────────────────────────────┘
```

Fig. 13

(FIRST MODIFICATION)

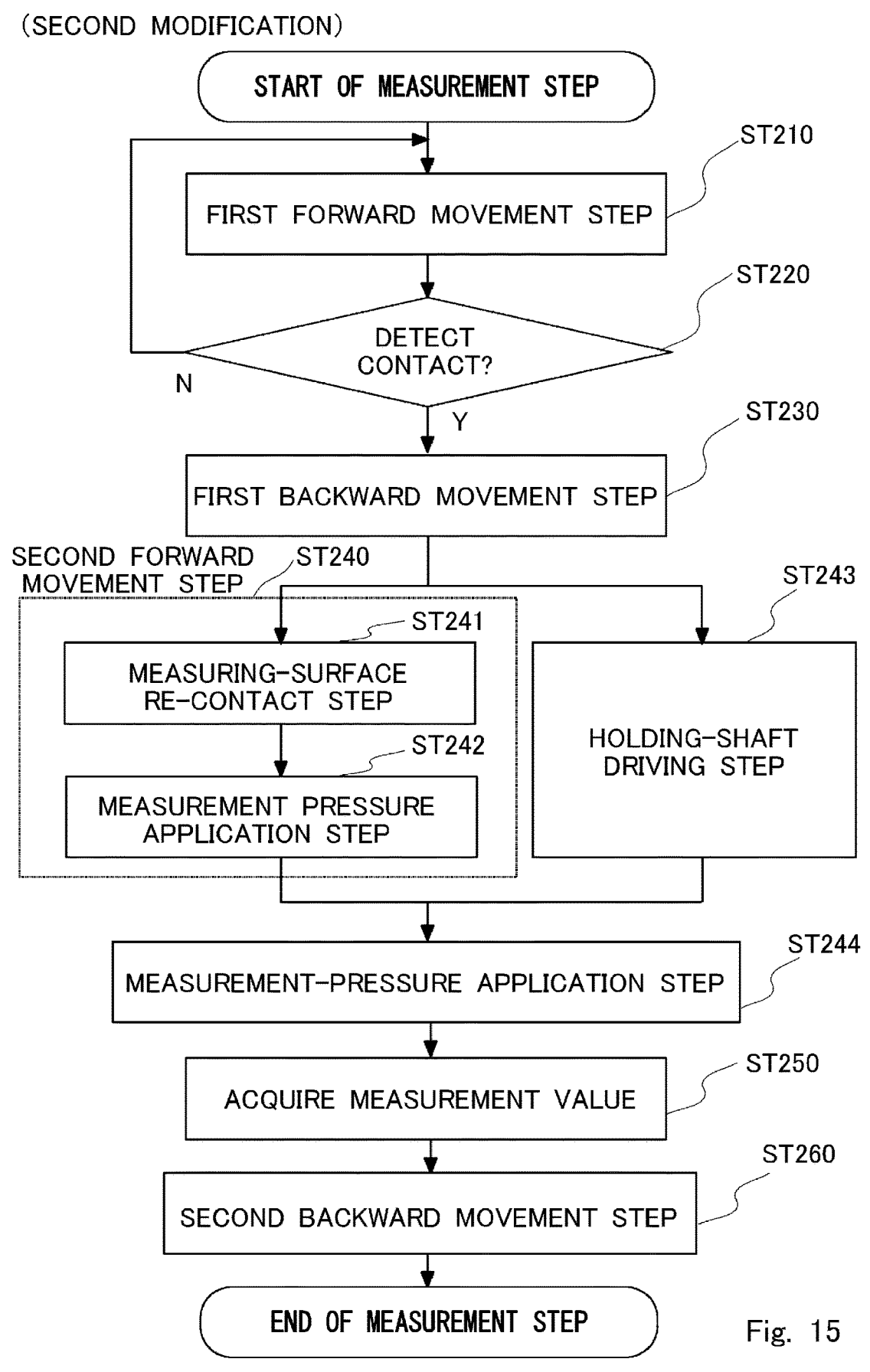

(SECOND MODIFICATION)

START OF MEASUREMENT STEP

FIRST FORWARD MOVEMENT STEP     ST210

DETECT CONTACT?     ST220

N

Y

FIRST BACKWARD MOVEMENT STEP     ST230

SECOND FORWARD MOVEMENT STEP    ST240     ST243

ST241

MEASURING-SURFACE RE-CONTACT STEP

ST242

MEASUREMENT PRESSURE APPLICATION STEP

HOLDING-SHAFT DRIVING STEP

MEASUREMENT-PRESSURE APPLICATION STEP     ST244

ACQUIRE MEASUREMENT VALUE     ST250

SECOND BACKWARD MOVEMENT STEP     ST260

END OF MEASUREMENT STEP     Fig. 15

1

AUTOMATIC MEASURING APPARATUS AND CONTROL METHOD FOR THE SAME

INCORPORATION BY REFERENCE

This application is based upon and claims the benefit of priority from JP patent application No. 2023-017945, filed on Feb. 8, 2023 (DAS code 93AC), the disclosure of which is incorporated herein in its entirety by reference.

BACKGROUND OF THE INVENTION

1. Field of the Invention

The present invention relates to an automatic measuring apparatus that automatically measures a workpiece using a small-sized measuring device that measures a dimension of the workpiece and a control method for the automatic measuring apparatus.

2. Description of Related Art

Micrometers and calipers are known as measuring devices (measuring tools) for measuring a dimension of a workpiece. Such contact-type measuring devices (measuring tools) are widely used because of their advantages, such as ease of use, measurement stability, and relatively low cost. However, in order to measure a workpiece, it is required for the workpiece and a movable element (spindle or measuring jaw) to be in close contact properly and for the same measurement pressure to be constantly applied, which inevitably results in manual measurement. Therefore, measurement with such a contact-type measuring device is time-consuming and labor intensive.

As an alternative to manual measurement, non-contact measuring devices, such as air micrometers and laser scan micrometers, have been proposed for use at production sites (JP H08-014871 A). However, air micrometers and laser scan micrometers are themselves extremely expensive and relatively difficult to maintain.

Patent Literature 1: JP H08-014871 A
Patent Literature 2: JP H10-89903 A
Patent Literature 3: JP 2019-100904 A

SUMMARY OF THE INVENTION

Although various proposals have been made to automate contact measurement, such as those using motor power, there have been no cases of successful practical applications that have been widely used by the general public (JP H10-089903 A). In addition, it is possible to automate contact measurement by using a coordinate measuring machine (CMM) or the like (JP 2019-100904 A), but it requires an investment of tens to hundreds of millions of yen, which is not appropriate to use a CMM as a substitute for measurement using a micrometer or caliper.

A purpose of the present invention is to provide an automatic measuring apparatus that automates an inexpensive and easy-to-use contact-type measuring device and a control method for the automatic measuring apparatus.

An automatic measuring apparatus according to an exemplary embodiment of the present invention is an automatic measuring apparatus configured to automatically measure a workpiece dimension, the automatic measuring apparatus comprising:

a measuring device configured to measure the workpiece dimension by detecting displacement of a movable element configured to move forward and backward to be brought into contact with or away from a workpiece;

an automatic operation part configured to automate the forward/backward movement of the movable element by power; and a workpiece holding part configured to hold the workpiece, wherein the workpiece holding part includes a holding shaft having a length in a direction along a direction of the forward/backward movement of the movable element and is configured to hold the workpiece while the holding shaft is inserted in a hole in the workpiece and to allow the workpiece to move in parallel along the holding shaft to change a position of the workpiece and to rotate to change a posture of the workpiece in such a manner that contacting surfaces of the workpiece and the movable element are in close contact with each other when the movable element is brought into contact with the workpiece.

In an exemplary embodiment of the present invention, it is preferable that the workpiece holding part is configured to hold the workpiece in such a manner that the workpiece is suspended on the holding shaft while the holding shaft is inserted in the hole in the workpiece.

In an exemplary embodiment of the present invention, it is preferable that the workpiece holding part includes:

a first finger including a first grasping surface from which the holding shaft protrudes; and a second finger including a second grasping surface provided with a hole through which the holding shaft is passed, and the workpiece holding part is configured to switch, while the holding shaft is inserted in the hole in the workpiece, between a grasping state in which the workpiece is sandwiched between the first grasping surface and the second grasping surface and a suspension state in which the grasping state is released.

In an exemplary embodiment of the present invention, it is preferable that the measuring device further includes a fixed element and is configured to acquire the workpiece dimension as a measurement value when the movable element and the fixed element are in close contact with the workpiece at a predetermined measurement pressure, and the workpiece holding part is configured, when holding the workpiece between the fixed element and the movable element of the measuring device, to hold the workpiece in such a manner that the holding shaft is passed through the hole in the workpiece and the workpiece is in contact with the fixed element.

In an exemplary embodiment of the present invention, it is preferable that the workpiece holding part includes a slide auxiliary tool configured to slide on the holding shaft with low friction, and is configured to hold the workpiece with the slide auxiliary tool.

In an exemplary embodiment of the present invention, it is preferable that the workpiece holding part includes a holding-shaft driving means for moving the holding shaft forward and backward in an axial direction or vibrating the holding shaft.

A control method for an automatic measuring apparatus, the automatic measuring apparatus comprising:

a measuring device configured to measure a workpiece dimension by detecting displacement of a movable element configured to move forward and backward to be brought into contact with or away from a workpiece;

an automatic operation part configured to automate the forward/backward movement of the movable element by power; and a workpiece holding part including a holding shaft having a length in a direction along a direction of the forward/ backward movement of the movable element and configured to hold the workpiece while the holding shaft is inserted in a hole in the workpiece, the control method comprises:

moving, by the automatic operation part, the movable element forward to bring the movable element into contact with the workpiece;

allowing, by the workpiece holding part, the workpiece to move in parallel along the holding shaft to change a position of the workpiece and to rotate to change a posture of the workpiece with a pressure lower than a measurement pressure preset in the measuring device; and acquiring, by the measuring device, a measurement value when the workpiece and the movable element are in close contact and a predetermined measurement pressure is generated between the workpiece and the movable element.

BRIEF DESCRIPTION OF THE DRAWINGS

FIG. 13 is a flowchart showing a procedure of a measurement step in the second exemplary embodiment;

FIG. 15 is a flowchart showing a procedure of a measurement step in a second modification.

DETAILED DESCRIPTION

Figure 1:
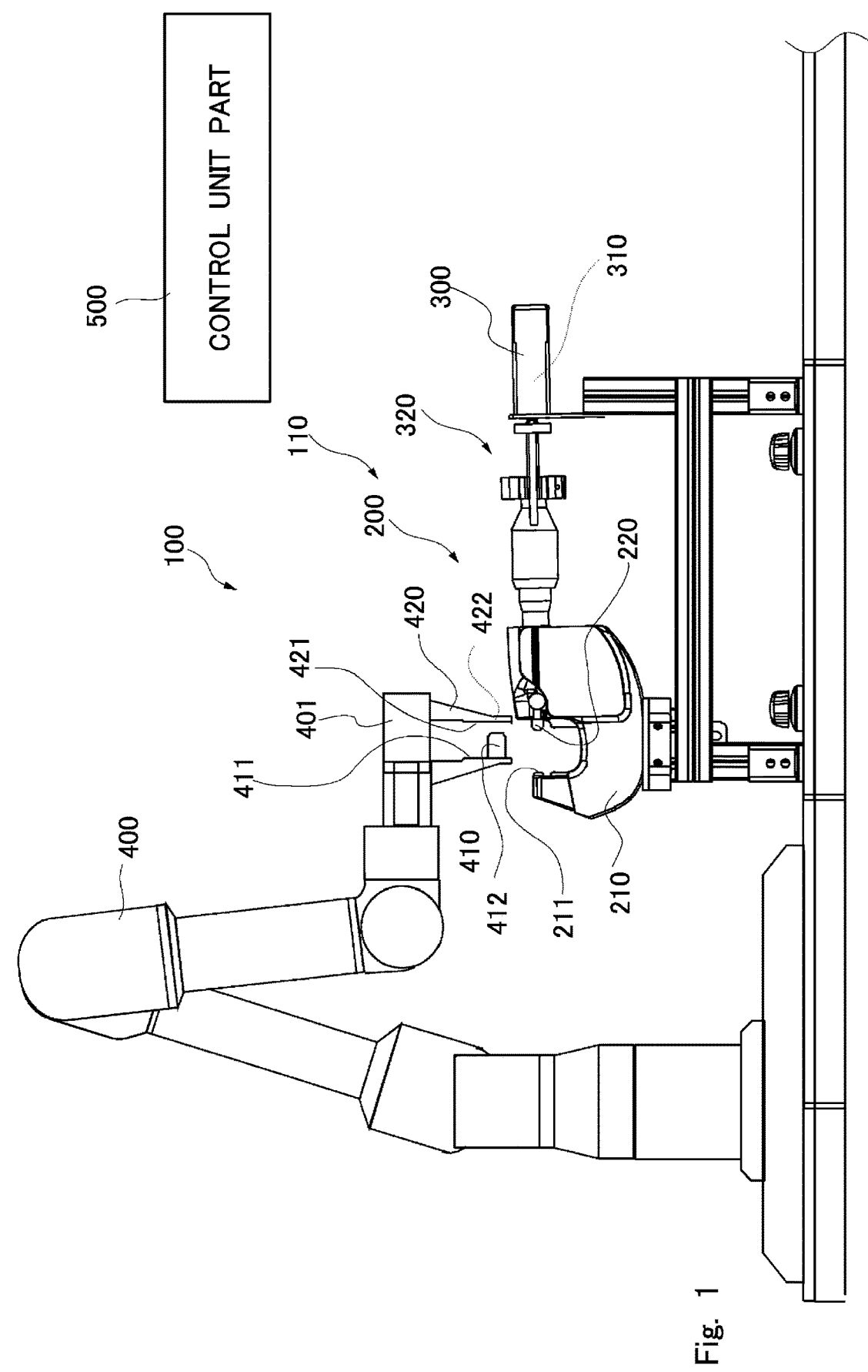
FIG. 1 is a view showing an overall configuration of an automatic measuring apparatus.

Embodiments of the present invention are illustrated and described with reference to the reference signs assigned to the elements in the drawings.

First Exemplary Embodiment

A first exemplary embodiment of the present invention is described below.

FIG. 1 is a view showing an overall configuration of an automatic measuring apparatus 100.

The automatic measuring apparatus 100 according to the first exemplary embodiment of the present invention includes a measuring device part 200, an automatic operation part 300, a robot arm part 400, and a control unit part 500.

The combination of the measuring device part 200 and the automatic operation part 300 is an automatic measuring device part 110.

In the first exemplary embodiment, the unit combining a micrometer (measuring device part) 200 and the automatic operation part 300 is referred to as an automatic micrometer part (automatic measuring device part) 110.

(Measuring Device Part 200)

Figure 2:
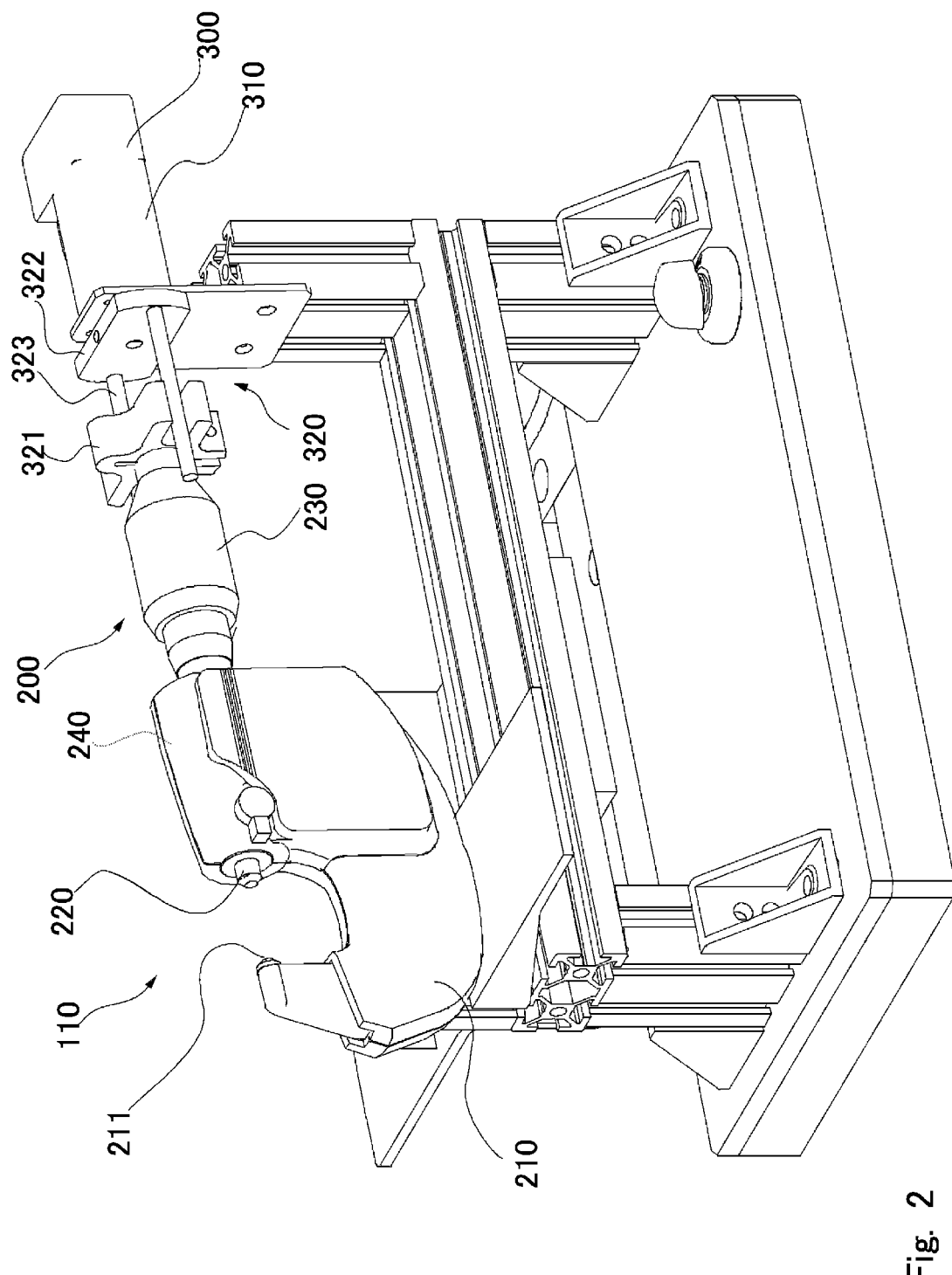
FIG. 2 is an external perspective view of an automatic micrometer part.

FIG. 2 is an external perspective view of the automatic micrometer part 110.

The measuring device part 200 is a measuring device that actually measures a dimension of a workpiece W. The measuring device part 200 in the present exemplary embodiment is what is called the micrometer 200.

The micrometer 200 is originally a small-sized, manually operated measuring device, and a commercially available micrometer 200 can be used as the measuring device part 200 in the present exemplary embodiment.

The configuration of the micrometer 200 is briefly described below.

The micrometer 200 includes a U-shaped frame (fixed element) 210, a spindle (movable element) 220, a thimble part 230, and a displacement detection part 240.

The U-shaped frame 210 includes an anvil 211 inside one end of the U-shape.

The spindle 220 is provided at the other end of the U-shaped frame 210 and is axially movable forward and backward with respect to the anvil 211. The spindle 220 is provided with a measuring surface on one end face of the spindle 220 to be brought into contact with the workpiece W. The anvil 211 is provided with a measuring surface on the other end face of the anvil 211 to be brought into contact with the workpiece W. The measuring surfaces are machined into flat surfaces and formed of cemented carbide material or ceramic. The spindle 220 is fed and moved axially forward and backward by the rotary operation of the thimble part 230.

The area between the anvil 211 and spindle 220 is a measurement area. An object to be measured (workpiece W) in the measurement area is sandwiched by the measuring surface of the anvil 211 and the measuring surface of the spindle 220 at a predetermined measurement pressure, and a dimension of the workpiece W is acquired as a measurement value based on the displacement (position) of the spindle 220 at that time. The axis along which the spindle (movable element) 220 moves forward and backward is a measurement axis of the measuring device part 200.

There are two types of methods for feeding the spindle 220: a rotary feed type in which the spindle 220 itself rotates, and a linear feed type in which the spindle 220 itself does not rotate. In the rotary feed type, the spindle 220 is provided with a male thread, and the U-shaped frame 210 is provided with a female thread. The thimble part 230 and the spindle 220 are engaged to rotate together, and the spindle 220 is rotated by the rotary operation of the thimble part 230. Then, the spindle 220 is moved forward or backward by the screw feed. In the linear feed type, a feed screw is provided inside the thimble part 230, and the spindle 220 is provided with a pin that engages with the feed screw. When the thimble part 230 is rotated while the spindle 220 is locked, the spindle 220 is fed by the engagement between the pin and the feed screw. The type of the micrometer 200 employed in the present embodiment can be either the rotary feed type or the linear feed type.

The thimble part 230 is disposed at the other end of the spindle 220 at the other end of the U-shaped frame 210. The thimble part 230 is an operation part that moves the spindle 220 forward and backward by rotary operation.

Here, the micrometer 200 employed in the present embodiment preferably includes a constant pressure mechanism between the thimble part 230 and the spindle 220.

The constant pressure mechanism disengages the thimble part 230 and the spindle 220 when a preset load is applied to the spindle 220, thereby causing the thimble part 230 to idle against the spindle 220. By constantly activating the constant pressure mechanism in the same proper manner during measurement, the measurement pressure during measurement can be kept constant, and the measurement accuracy (repeatability) can be kept high. The constant pressure mechanism is incorporated in a commercially available micrometer 200 and is disclosed in JP 3115555 B, JP 3724995 B, JP 5426459 B, and JP 5270223 B. The constant pressure mechanism can be constituted by a ratchet mechanism that allows slippage to occur when a force exceeding a predetermined load is applied between the thimble part 230 and the spindle 220, or a plate spring interposed between an outer cylinder and an inner sleeve of the thimble part 230 to allow slippage to occur when the predetermined load is applied.

The micrometer 200 employed in the present embodiment preferably includes a measurement-pressure detection mechanism that detects the load applied to the spindle 220.

For example, such a measurement-pressure detection mechanism is disclosed in JP 3751540 B, JP 4806545 B, and JP 7208717 B. The measurement-pressure detection mechanism may directly or indirectly detect the load applied to the spindle 220 with a strain gauge or the like, or may detect that the load applied to the spindle 220 has reached a predetermined value by the activation of the constant pressure mechanism. The measurement-pressure detection mechanism outputs a signal (measurement pressure signal) when detecting the predetermined measurement pressure. For example, the displacement detection part 240 performs sampling (latching) of a measurement value (displacement) in response to the detection of the predetermined measurement pressure by the measurement-pressure detection mechanism.

The displacement detection part 240 detects the displacement (or position) of the spindle 220. The displacement detection part 240 is constituted by a rotary encoder or a linear encoder.

The displacement detection part 240 may be an analog type (scale type) instead of an encoder. In this case, for automation, the scale may be read by a digital camera or the like, and the measurement value may be read by image analysis (image recognition). In this case, the displacement detection part 240 may be constituted by an analog-type scale, a digital camera, and an image analysis unit (image recognition unit).

In addition, the U-shaped frame 210 may include a display panel part for displaying a measurement value and switches for operation on its front face. The U-shaped frame 210 has a measurement-value output function that outputs the measurement value externally via wired or wireless communication as a function of a built-in electric circuit.
(Automatic Operation Part 300)

The automatic operation part 300 automates the forward/backward movement of the spindle (movable element) 220 by the power of a motor (drive device) 310. The automatic operation part 300 includes a motor 310 and a power transmission part 320.

The motor 310 may be a normal electric motor that extracts the rotation of the rotor to the output shaft. The motor 310 is preferably able to control the rotation angle (the number of revolutions) of forward and reverse rotation to some extent with control pulses. In addition, the motor 310 may have a torque detection function. (Various methods are known for detecting motor torque itself, such as determining the torque from the increase or decrease in the applied current (applied voltage).) A stepping motor can be used as the motor 310. (Needless to say, a servo motor or a synchronous motor is also used, and the structure and drive system of the motor 310 are not particularly limited.)

The power transmission part 320 includes a fastening ring 321, a rotating plate 322, and a transmission link rod 323.

The fastening ring 321 is externally fitted onto the thimble part 230. The rotating plate 322 is provided to rotate in synchronization with the rotation axis of the rotor of the motor 310. The transmission link rod 323 connects the fastening ring 321 and the rotating plate 322. One end of the transmission link rod 323 is fixed to the fastening ring 321 and the other end is fixed to the rotating plate 322. The transmission link rod 323 is parallel to the center axis (measurement axis) of the spindle 220. When the rotating plate 322 is rotated by the motor 310, the rotation is transmitted to the fastening ring 321 through the transmission link rod 323, and the fastening ring 321 is rotated in synchronization with the rotating plate 322
(Robot Arm Part 400)

The robot arm part 400 is what is called an articulated robot arm and includes a hand part 401 (workpiece W holding part) that holds the workpiece W at its tip. The robot arm part 400 grasps the machined workpiece W and carries the workpiece W to the measurement area of the measuring device part 200.

Here, the object to be measured (workpiece W) in the present exemplary embodiment includes a hole, and the direction of the center line of the hole is perpendicular to the surface to be measured. For example, a disc-shaped grinding wheel (disc grinding wheel, disc cutting grinding wheel) is one example. The thickness (outer dimension, outside dimension) of a disc grinding wheel W is inspected and measured by the automatic measuring apparatus 100 in the present exemplary embodiment. The object to be measured (workpiece W) is preferably a relatively thin disc-shaped member with a through hole in the center, but is not limited thereto. The hole does not need to be a through hole, the hole does not need to be in the center of the workpiece W, and the workpiece W does not need to be limited to a thin flat object.

The hand part 401 includes two fingers 410 and 420 provided to be movable in a direction to be brought into contact with or away from each other. The two fingers are referred to as a first finger 410 and a second finger 420.

The first finger 410 and the second finger 420 have flat surfaces for grasping and holding the workpiece W from both sides of the surfaces facing each other. Of the surfaces facing each other, the flat surface of the first finger 410 is a first grasping surface 411, and the flat surface of the second finger 420 is a second grasping surface 421. In addition, the first grasping surface 411 of the first finger 410 includes a columnar (cylindrical) holding shaft 412 erected perpendicular to the first grasping surface 411.

The second grasping surface 421 of the second finger 420 includes a hole 422 provided for passing the holding shaft 412 therethrough. (The hole 422 in the second finger 420 is shown in, for example, the cross-sectional view in FIG. 7.)

When the first finger 410 and the second finger 420 are brought close together and the workpiece W is grasped between the first grasping surface 411 and the second grasping surface 421 while the holding shaft 412 is passed through the hole in the workpiece W, the workpiece W can be firmly fixed and grasped by the hand part 401. When the first finger 410 and the second finger 420 are slightly separated away from each other while the holding shaft 412 is passed through the hole in the workpiece W, the workpiece W is suspended from the holding shaft 412. At this time, the workpiece W can move in parallel (translate) along the holding shaft 412. In addition, the workpiece W can change in posture of rotation using the virtual axis parallel to the virtual line intersecting the holding shaft 412 as the rotation axis. (The holding shaft 412 is designed to be slightly smaller than the diameter of the hole in the workpiece W in such a manner that there is a gap between the outer circumference of the holding shaft 412 and the inner circumference of the hole in the workpiece W to the extent that rotation of the workpiece W can be allowed)

(Control Unit Part 500)

Figure 3:
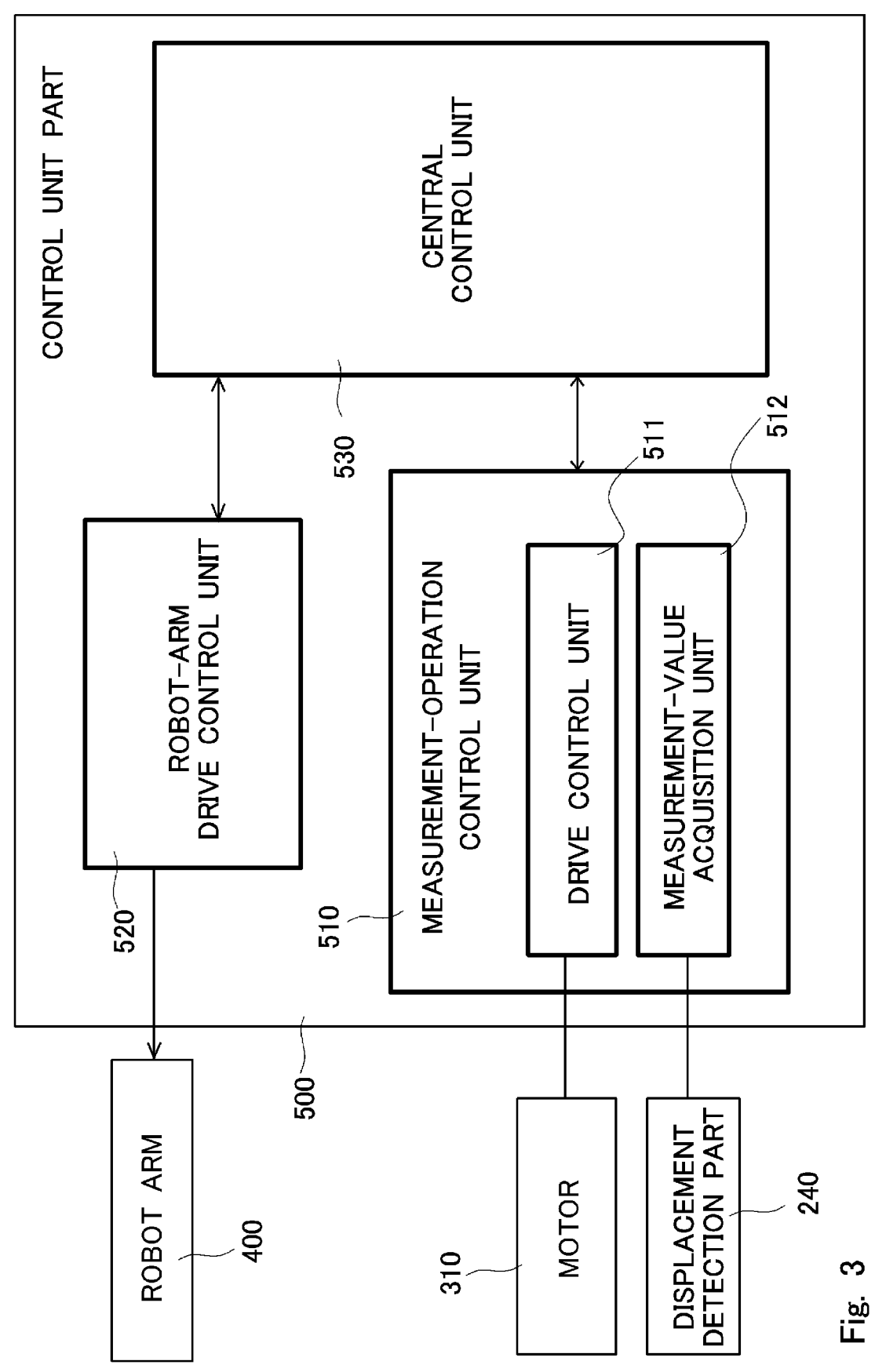
FIG. 3 is a functional block diagram of a control unit part.

FIG. 3 is a functional block diagram of the control unit part 500. The control unit part 500 is constituted by hardware or software built into a computer (what is called a computer terminal including a central processing unit (CPU), and a read only memory (ROM) or a random access memory (RAM) storing predetermined programs).

The control unit part 500 is connected to the measuring device part 200, the automatic operation part 300, and the robot arm part 400 by wired or wireless communication to control the operation of the measuring device part 200, the automatic operation part 300, and the robot arm part 400. An operation control program (measuring part program) is installed in the computer terminal, and the measurement operation is controlled by executing the program.

The method of supplying the program is not limited. The program may be installed by inserting a (nonvolatile) recording medium recording the program directly into the computer, or a reading device that reads the information on the recording medium may be attached externally to the computer to install the program into the computer from the reading device. Alternatively, the program may be supplied to the computer via a communication line, such as the Internet, a LAN cable, or a telephone line, or wirelessly.

The control unit part 500 includes a measurement-operation control unit 510, a robot-arm drive control unit 520, and a central control unit 530.

The measurement-operation control unit 510 controls the measurement operation of the automatic micrometer part 110 (the measuring device part 200 and the automatic operation part 300). The measurement-operation control unit 510 includes a drive control unit 511 and a measurement-value acquisition unit 512.

The drive control unit 511 controls the drive of the motor (drive device) 310 of the automatic operation part 300, and controls the forward/backward movement of the spindle (movable element) 220. The measurement-value acquisition unit 512 acquires a measurement value from the measuring device part 200. That is, the measurement-value acquisition unit 512 receives a detection value of the displacement detection part 240 to acquire the dimension of an object to be measured (workpiece W) as the measurement value based on the displacement (position) of the spindle 220.

The robot-arm drive control unit 520 controls the operation of the robot arm part 400. The central control unit 530 integrally controls the measurement-operation control unit 510 and the robot-arm drive control unit 520.

(Measurement Operation)

The operation of the automatic measuring apparatus 100 to automatically measure the dimension of a workpiece W is described below.

As an example, a disc grinding wheel W is used as the workpiece W, and the thickness of the disc grinding wheel W is inspected and measured.

Figure 4:
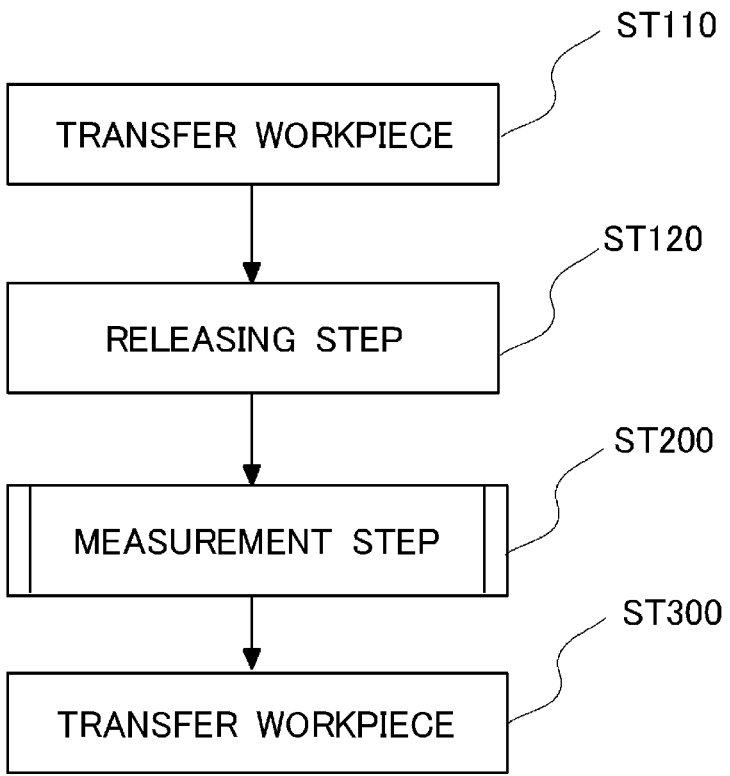
FIG. 4 is a flowchart for explaining an automatic measurement operation to automatically measure a workpiece.

FIG. 4 is a flowchart showing the measurement operation to measure one workpiece W.

First, the robot arm part 400 transfer the disc grinding wheel W to the measurement area of the micrometer 200 in response to an operation command from the robot-arm drive control unit 520 (a transferring step ST110).

Figure 6:
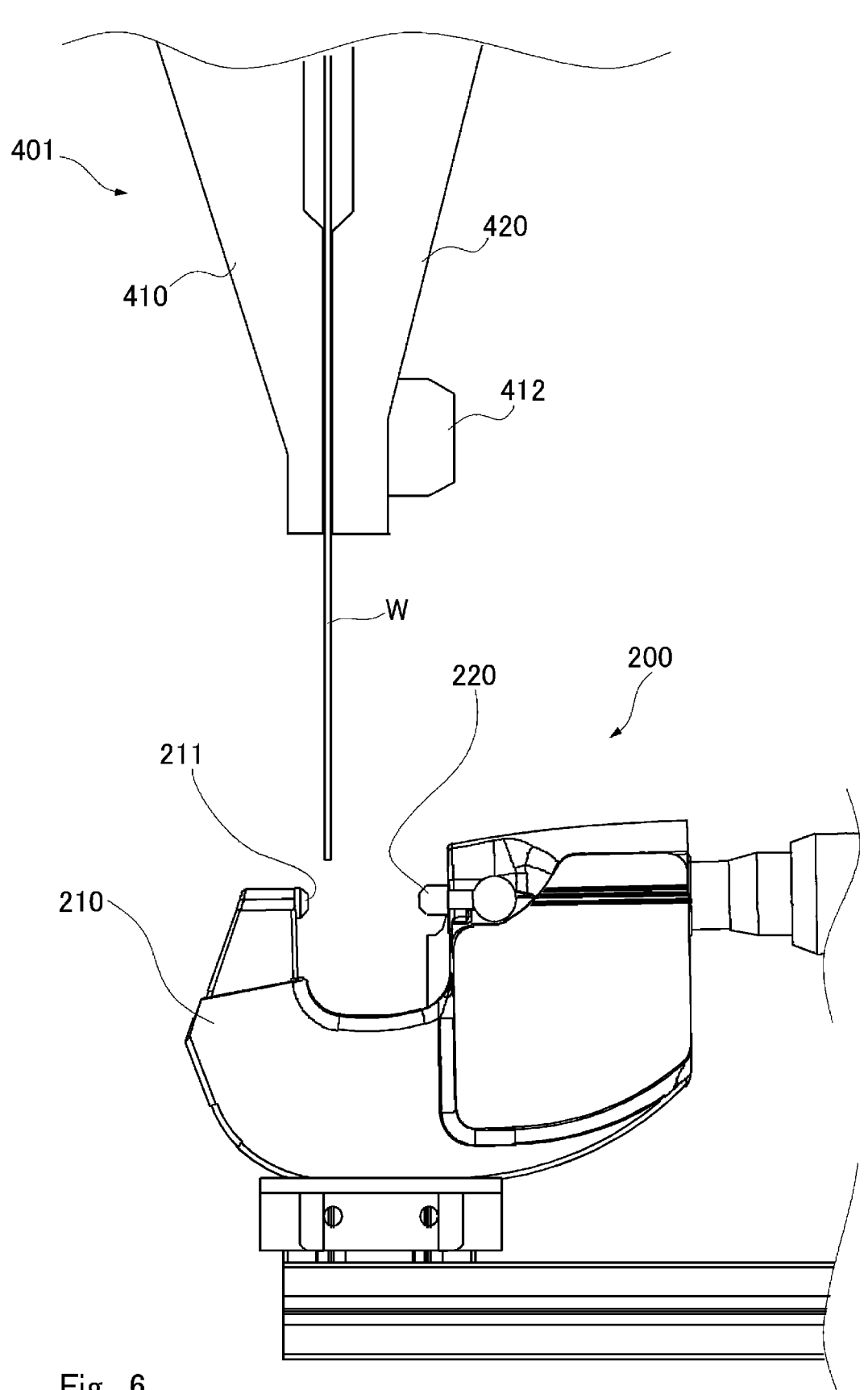
FIG. 6 is a view when a workpiece is grasped by a hand part.
Figure 7:
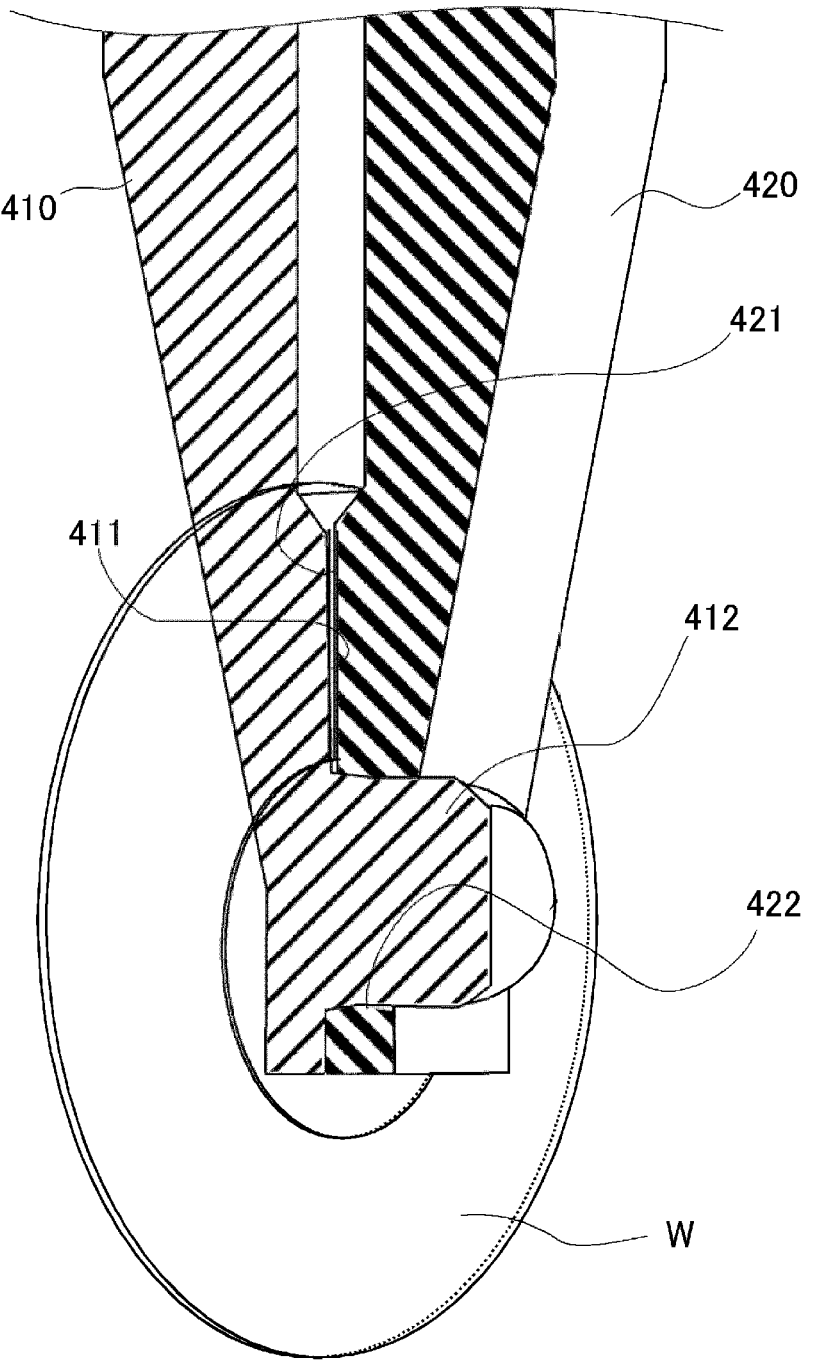
FIG. 7 is a cross-sectional view when the workpiece is grasped by the hand part.

At this time, the robot arm part 400 grasps the disc grinding wheel W with the hand part 401, as illustrated in FIGS. 6 and 7.

FIG. 6 is a view when the workpiece W is grasped by the hand part 401.

FIG. 7 is a cross-sectional view when the workpiece W is grasped by the hand part 401.

The holding shaft 412 of the first finger 410 is passed through the hole in the disc grinding wheel W. The holding shaft 412 is further passed through the hole 422 in the second finger 420, and in this state, the first grasping surface 411 of the first finger 410 and the second grasping surface 421 of the second finger 420 are brought close together to grasp the disc grinding wheel W. The disc grinding wheel W grasped by the hand part 401 is transferred to the measurement area of the micrometer 200.

Figure 8:
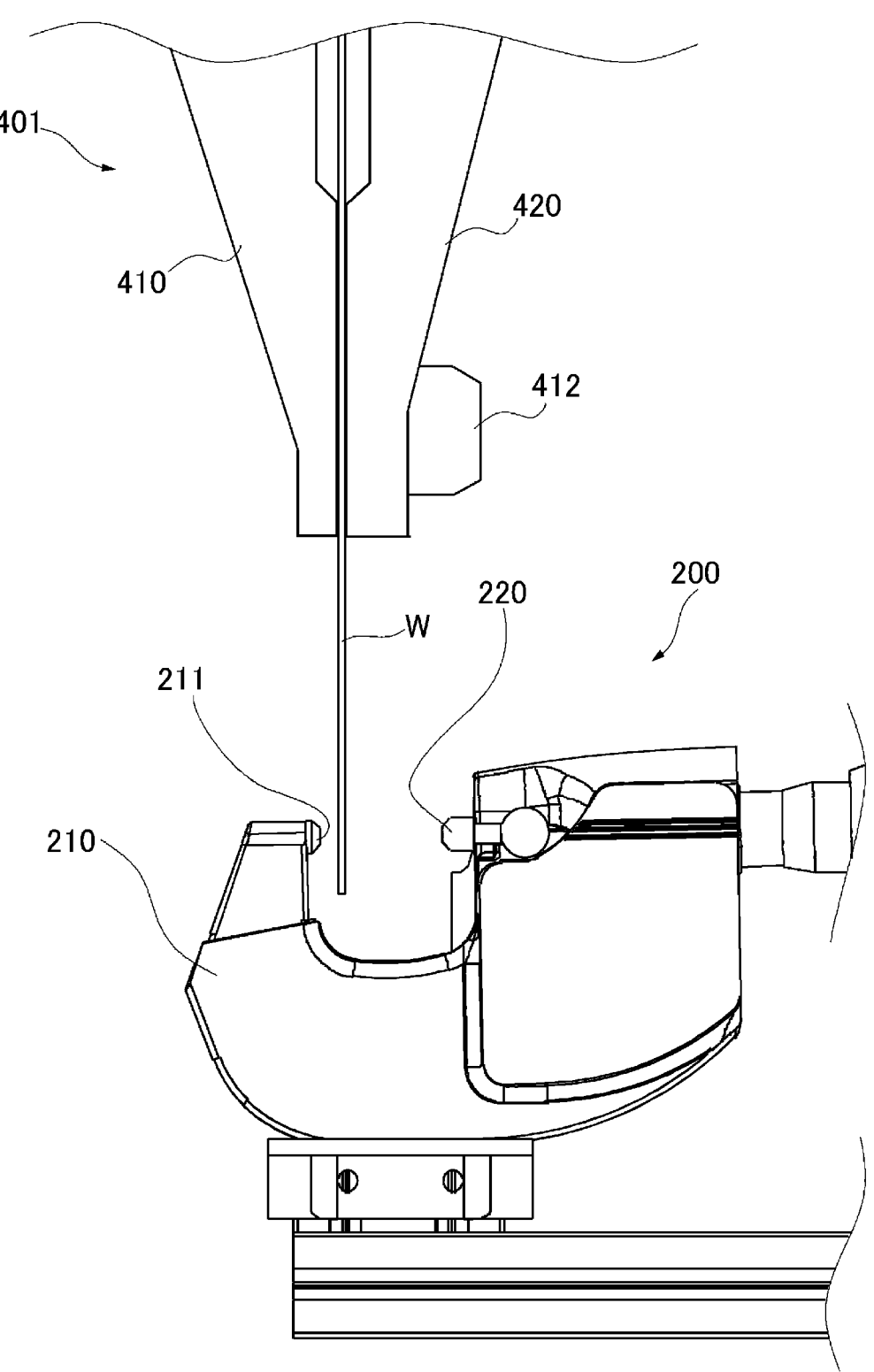
FIG. 8 is a view when the workpiece is inserted by the hand part in a measurement area of a measuring device part.

FIG. 8 is a view when the workpiece W is inserted in the measurement area of the micrometer (measuring device part) 200 by the hand part 401.

Since the thickness of the disc grinding wheel W is to be measured, the thin disc grinding wheel W needs to be in a posture perpendicular to the measurement axis of the micrometer 200, as shown in FIG. 8. In other words, when the direction from the front surface toward the back surface of the disc grinding wheel W is the thickness direction of the disc grinding wheel W, the thickness direction of the disc grinding wheel W needs to be parallel to the measurement axis of the micrometer 200. The holding shaft 412 of the first finger 410 of the hand part 401 also needs to be parallel to the measurement axis of the micrometer 200.

The disc grinding wheel W is only required to be transferred within the measurement area of the micrometer 200, but the disc grinding wheel W is preferably positioned as close to the anvil 211 as possible.

Figure 9:
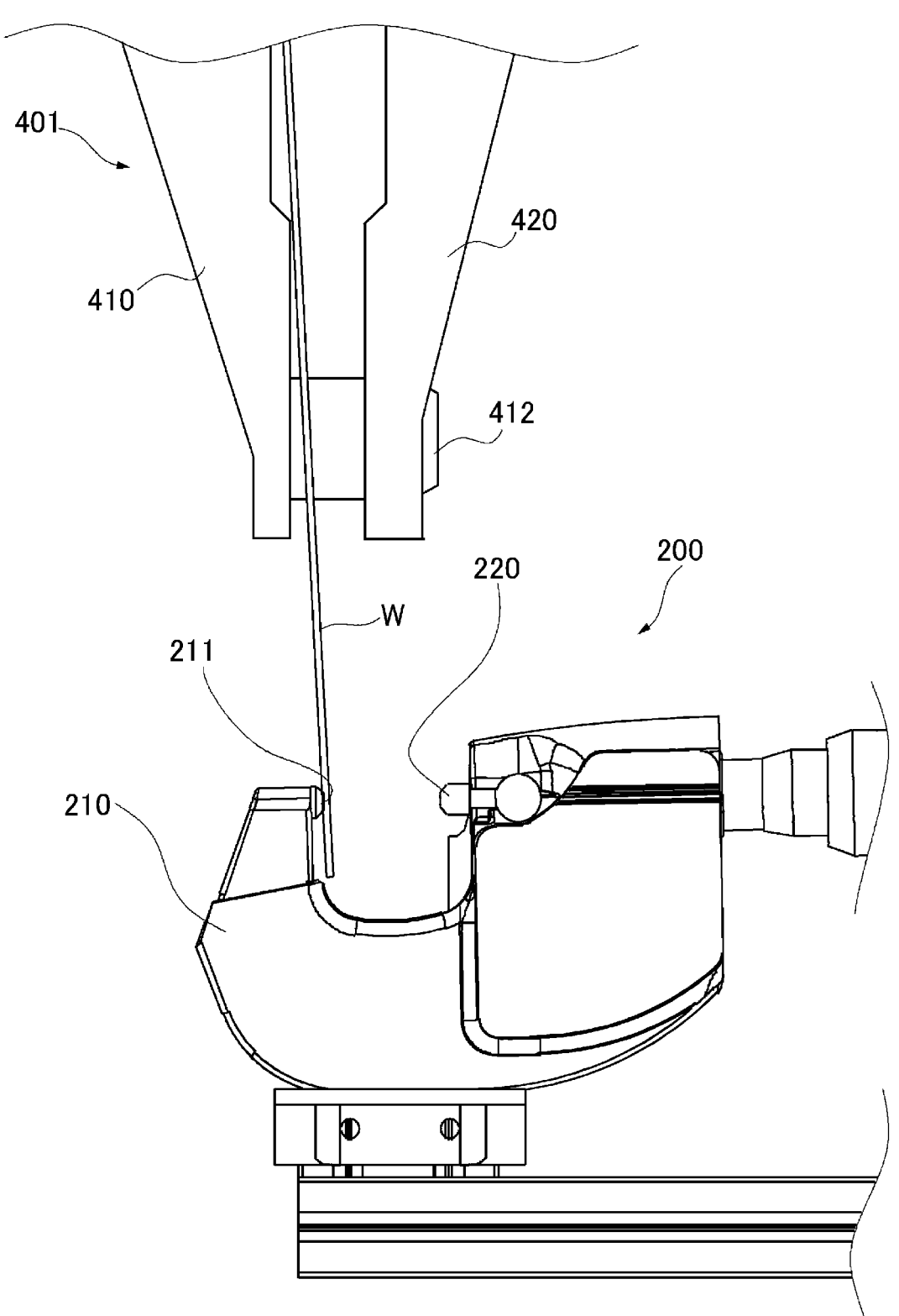
FIG. 9 is a view when the hand part releases the workpiece and the workpiece is held to be suspended on a holding shaft.

Next, the robot arm part 400 separates the first finger 410 and the second finger 420 of the hand part 401 to release the state in which the disc grinding wheel W is grasped from both sides (grasping state) (a releasing step ST120). That is, the hand part 401 holds the disc grinding wheel W to be suspended on the holding shaft 412 while the disc grinding wheel W is in the measurement area of the measuring device part 200. The hand part 401 thereby holds the disc grinding wheel W to allow parallel (translational) movement and rotation of the disc grinding wheel W. FIG. 9 is a view when the hand part 401 has released the disc grinding wheel W and the disc grinding wheel W is held to be suspended on the holding shaft 412. At this time, the first grasping surface 411 of the first finger 410 moves away from the spindle 220 toward the anvil 211, furthermore, the first grasping surface 411 of the first finger 410 moves further away from the spindle 220 than the anvil 211. The disc grinding wheel W is on the holding shaft 412 and also moves together with the holding shaft 412. Then, as shown in FIG. 9, the disc grinding wheel W is brought into contact with the anvil 211 and leans against the anvil 211. In this manner, the object to be measured (disc grinding wheel W) is automatically transferred to the measurement area of the measuring device part 200 (micrometer 200) and held to be suspended.

Then, the disc grinding wheel W is automatically measured by the measuring device part 200 (micrometer 200).

The drive of the motor (drive device) 310 is controlled in response to a drive command from the drive control unit 511, which automatically moves the spindle 220 forward and backward to automatically acquire the dimension (thickness) of the disc grinding wheel W.

Figure 5:
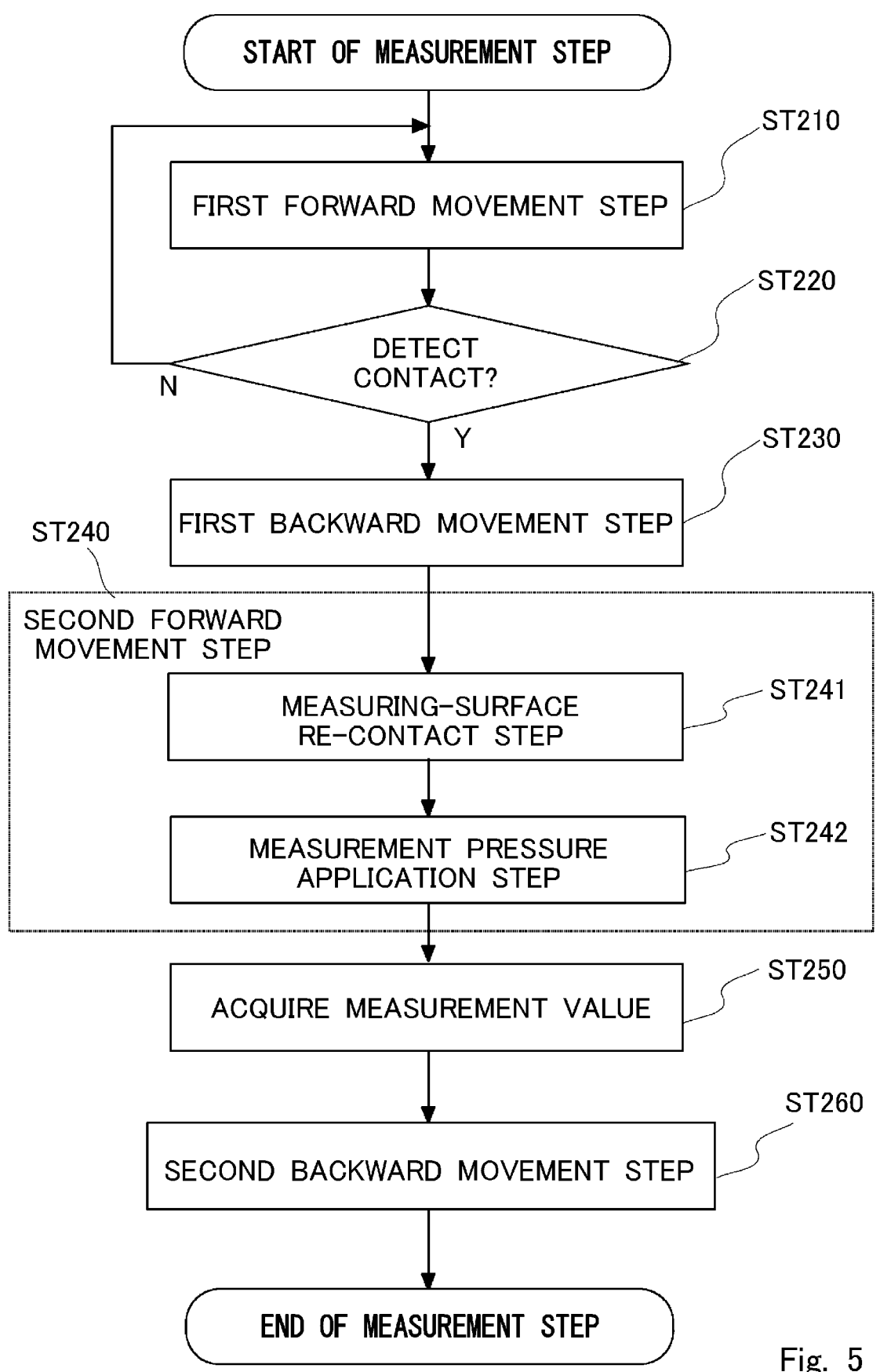
FIG. 5 is a flowchart showing a procedure of a measurement step.

FIG. 5 is a flowchart showing a procedure of a measurement step (ST200).

In the measurement step (ST200), a first forward movement step (ST210) is performed. In the first forward movement step (ST210), the spindle 220 is moved forward toward the anvil 211 until the spindle 220 is brought into first contact with the disc grinding wheel W (until the first contact can be detected). In the first forward movement step (ST210), the motor 310 is preferably driven at high speed to move the spindle 220 as fast as possible to improve measurement efficiency. The rotational speed of the motor 310 is, for example, 180 rpm (or about 100 rpm to 200 rpm).

Here, the disc grinding wheel W is suspended on the holding shaft 412 and is not rigidly fixed.

Figure 10:
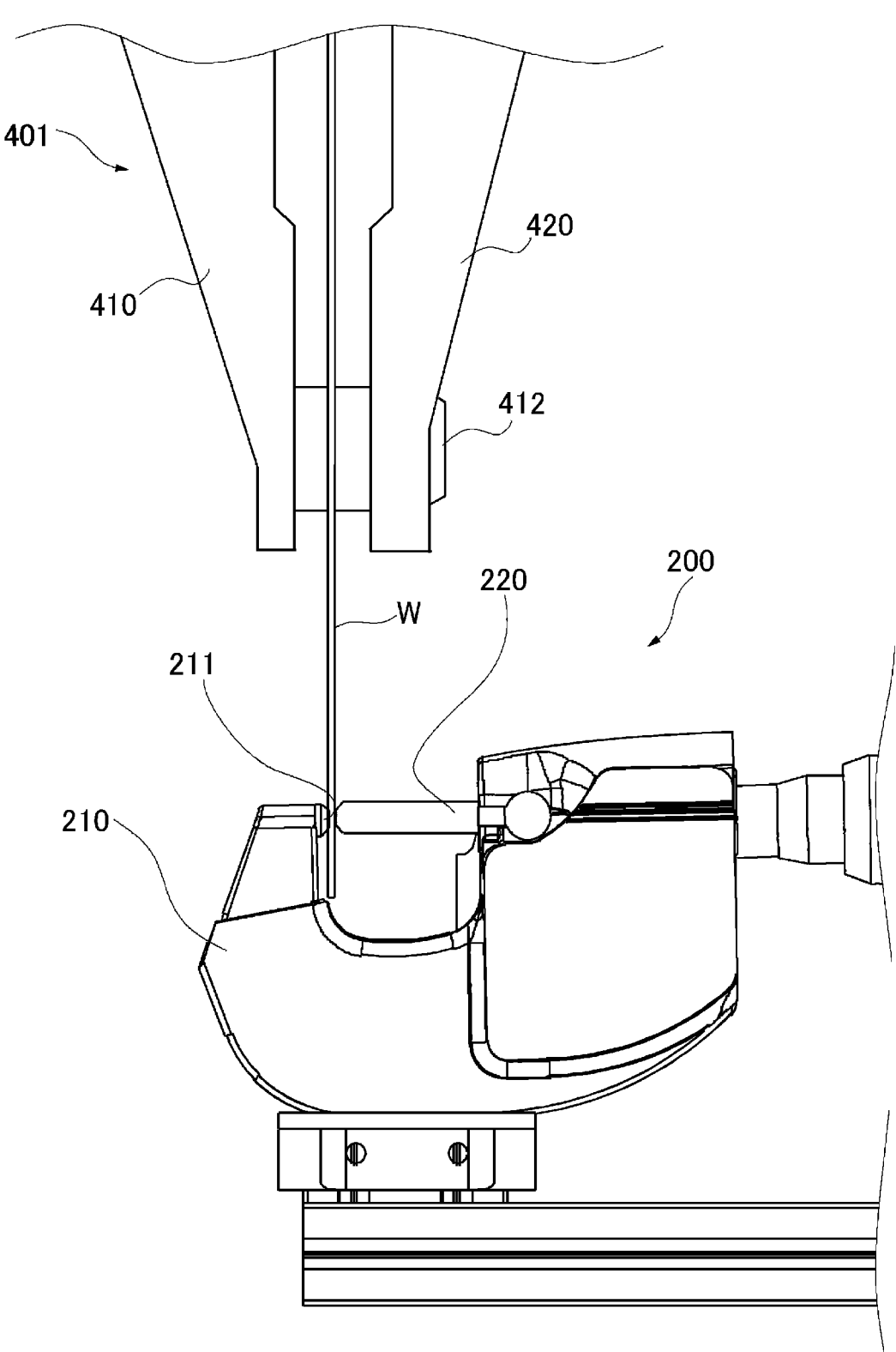
FIG. 10 is a view when the workpiece is sandwiched between a spindle and an anvil.

Since only a small frictional force in point contact with the holding shaft 412 regulates the disc grinding wheel W, when the spindle 220 is moved forward and is brought into contact with the disc grinding wheel W, the disc grinding wheel W is pushed by the spindle 220 with a force less than the predetermined measurement pressure and moves in parallel (translates) and rotates. Then, as shown in FIG. 10, the spindle 220 pushes the disc grinding wheel W toward the anvil 211, and the disc grinding wheel W is sandwiched between the measuring surface of the spindle 220 and the measuring surface of the anvil 211. At this time, the disc grinding wheel W having leaned against the anvil 211 rotates to be upright by being sandwiched between the measuring surface of the spindle 220 and the measuring surface of the anvil 211 and changes its posture.

In the previous transferring step (ST110) and releasing step (ST120), the disc grinding wheel W (workpiece W) has been transferred at a position close to the anvil 211 (fixed element) and then released to be in contact with the anvil 211.

This makes the translational (parallel) movement distance of the disc grinding wheel W pushed by the spindle 220 as short as possible. Ideally, if the disc grinding wheel W is in contact with the anvil 211 from the beginning, the translational (parallel) movement distance of the disc grinding wheel W is almost zero. If, on the other hand, the disc grinding wheel W is transferred at a position close to the spindle 220, the disc grinding wheel W is to be pushed a long distance by the spindle 220 toward the anvil 211. Then, even if the frictional force between the holding shaft 412 and the disc grinding wheel W is small, the holding shaft 412 or the disc grinding wheel W can be damaged in tens of thousands of repeated measurements. Therefore, when the disc grinding wheel W is transferred to the measurement area in the transferring step ST110 and the disc grinding wheel W is released in the releasing step ST120, it is preferable to release the disc grinding wheel W in the measurement area closer to the anvil 211 than in the center of the spindle 220 and the anvil 211. Furthermore, it is most preferable that the disc grinding wheel W is in contact with the anvil 211 when the disc grinding wheel W is released.

When the disc grinding wheel W is sandwiched between the measuring surface of the anvil 211 and the measuring surface of the spindle 220, and the measuring surface of the spindle 220 is first brought into close contact with the surface of the disc grinding wheel W, it is detected that the spindle 220 has been in contact with the disc grinding wheel W (ST220:YES). The fact that the spindle 220 has been in contact with the disc grinding wheel W may be determined by, for example, calculating the torque of the motor 310 from the applied current (applied voltage) of the motor 310 to confirm that the torque exceeds a predetermined value. Alternatively, the fact that the spindle 220 has been in contact with the disc grinding wheel W may be determined by monitoring the detection value of the displacement detection part 240 to confirm that the detection value stops increasing although a drive signal is transmitted. When it is detected that the spindle 220 has been in contact with the disc grinding wheel W (ST220: YES), the first forward movement step (ST210) is stopped and the procedure proceeds to a first backward movement step (ST230).

In the first backward movement step (ST230), the spindle 220 is moved backward slightly in the opposite direction. This avoids the spindle 220 from digging into the disc grinding wheel W due to its momentum after the spindle 220 has been brought into contact with the disc grinding wheel W in the first forward movement step (ST210). The distance for moving the spindle 220 backward in the first backward movement step (ST230) is very small, for example, 0.01 mm to 0.02 mm. The speed at which the spindle 220 is moved backward in the first backward movement step (ST230) may be as fast as possible. For example, the rotational speed of the spindle 220 may be 100 rpm to 200 rpm, or the movement speed may be 1 mm/s to 2 mm/s.

In this specification, the spindle 220 is moved backward as the first backward movement step, but the spindle 220 may be stopped instead of the backward movement.

After the spindle 220 is moved backward slightly in the first backward movement step (ST230), the spindle 220 is moved forward again in a second forward movement step (ST240). In the second forward movement step (ST240), the spindle 220 is moved forward slowly (at a low speed with fine movement).

The feeding speed of the spindle 220 in the second forward movement step (ST240) is preferably low (fine). For example, when the spindle 220 is a screw feed, the rotational speed of the spindle 220 is 10 rpm to 20 rpm. The movement speed of the spindle 220 may be 0.1 mm/s to 0.2 mm/s.

The position and inclination of the disc grinding wheel W are automatically (autonomously) adjusted by tightly sandwiching the front and back surfaces of the disc grinding wheel W between the measuring surfaces of the spindle 220 and the anvil 211. The ratchet mechanism (constant pressure mechanism) is then activated. In other words, the motor 310 rotates and drives the thimble part 230 to activate the ratchet mechanism (constant pressure mechanism), which brings the spindle 220 and anvil 211 into contact with the front and back surfaces of the disc grinding wheel W at the predetermined measurement pressure. In the second forward movement step (ST240), the motor is driven by a predetermined amount, that is, the spindle 220 is moved forward by a distance equivalent to the distance by which the spindle has been moved backward in the first backward movement step (ST230) (a measuring-surface re-contact step (ST241)). In addition, the motor (thimble part) is rotated by an amount by which the constant pressure mechanism is activated reliably (a measurement pressure application step (ST242)). As the result, the activation of the constant pressure mechanism is controlled in the same manner each time, the contact (close contact) between the anvil 211 and the workpiece W and between the spindle 220 and the workpiece W is ensured, and the measurement pressure applied from the anvil 211 and the spindle 220 to the workpiece W is the same each time.

The second forward movement step (ST240) can be rephrased as a workpiece-posture automatic (autonomous) adjustment step since it has the function of adjusting the posture of the disc grinding wheel W.

As the workpiece (disc grinding wheel) W is sandwiched by the anvil 211 and the spindle 220 at the predetermined measurement pressure, the workpiece (disc grinding wheel) W changes its posture from the inclined posture leaning against the anvil 211 as shown in FIG. 9 to the upright posture as shown in FIG. 10. The inner circumference of the hole in the workpiece (disc grinding wheel) W has been in contact with the holding shaft 412 in the state in FIG. 9, but when the workpiece (disc grinding wheel) W rotates and is upright as shown in FIG. 10, the inner circumference of the hole in the workpiece (disc grinding wheel) W is separated from the holding shaft 412. Therefore, when the workpiece (disc grinding wheel) W is sandwiched by the anvil 211 and the spindle 220 at the predetermined measurement pressure (FIG. 10), the workpiece (disc grinding wheel) W is virtually supported only by the anvil 211 and the spindle 220. At this time, no extra force is applied to the workpiece (disc grinding wheel) W from the holding shaft 412, and the workpiece (disc grinding wheel) W is simply sandwiched firmly by the anvil 211 and the spindle 220 at the predetermined measurement pressure. In the process of the autonomous posture adjustment of the workpiece W, the workpiece W is in close contact with the anvil 211 and the spindle 220, and the predetermined measurement pressure is firmly applied, while the workpiece is separated from the holding shaft 412 at the same time and no extra force other than the predetermined measurement pressure is applied to the workpiece W. Note that the workpiece is separated from the holding shaft when the workpiece (disc grinding wheel) W is sandwiched between the anvil 211 and the spindle 220 at the predetermined measurement pressure (FIG. 10), which is an ideal embodiment, but not essential for the present invention.

In this state, the displacement detection part 240 detects the displacement (position) of the spindle 220. The measurement-value acquisition unit 512 acquires the measurement value of the thickness (outer dimension) of the disc grinding wheel W based on the displacement (position) of the spindle 220 (ST250). After the measurement value is acquired, the spindle 220 is moved backward in a second backward movement step (ST260). The measurement value of one disc grinding wheel W is now acquired.

The disc grinding wheel W that has been measured is again grasped by the hand part 401 and is transferred (ST300) to be removed from the measurement area. This completes the measurement of one disc grinding wheel W. The procedure returns to ST110 and repeats ST110 to ST300 until measurement of all workpieces W (disc grinding wheels W) is completed.

With the automatic measuring apparatus 100 according to the present exemplary embodiment, it is possible to automate the measurement work of the workpiece W. The automatic measuring apparatus 100 according to the present exemplary embodiment automates the micrometer 200, which is a small contact-type measuring device (small-sized measuring tool). First, the micrometer 200 is a contact type and has extremely high measurement stability. In addition, the micrometer 200 is expected to already be owned by a typical factory. The micrometer 200 has a long history and is widely used in public, which makes it the most familiar measuring device for measurement operators. Operators are fully familiar with the necessary handling of the micrometer 200, such as calibration work, and rarely need to learn or train difficult work procedures. Therefore, the cost required to introduce automatic measurement can be kept extremely low, which contributes greatly to reducing labor shortages.

Various automatic measuring apparatuses have been proposed in the past, but most of them uses non-contact measuring tools. For example, many of them uses air micrometers, laser scan micrometers, or the like. However, such non-contact measuring devices are extremely expensive and somewhat difficult to maintain. In this respect, the automatic measuring apparatus 100 according to the present exemplary embodiment that can automate the micrometer 200 has the advantage of being inexpensive and easy to handle.

One of the reasons why it has been difficult to automate the micrometer 200, which is a representative of small-sized measuring devices (small-sized measuring tools), is that it is difficult to properly sandwich the workpiece W from both sides and fit the contact surface (measuring surface). In this regard, in the present exemplary embodiment, the workpiece W is suspended on the holding shaft 412 to change its position and posture by translational (parallel) movement and rotation when pushed by the spindle 220. In addition, the spindle 220 is moved forward and backward in several steps to firmly fit the measuring surface (contact surface) by using the contact detection and constant pressure mechanism, and then the predetermined measurement pressure is applied (ST240). Normally, when a thimble is manually rotated, the measurement is performed by rotating the thimble at a constant speed and applying constant pressure at the same constant rotation, but not by moving the thimble backward (retracted) or by operating the constant pressure mechanism in two slow and fast stages. However, through repeated experiments under different conditions, a control process different from manual operation has been devised, and it is possible to acquire stable measurement values even in automatic measurement. This makes it possible to automate the micrometer 200. In addition, since the workpiece W can be always measured with the same operation by the motor control, there is no problem of differences in measurement values caused by the skill level of each operator or their movement habits.

Second Exemplary Embodiment

In the above first exemplary embodiment, it is assumed that the workpiece W can slide on the holding shaft 412 when the workpiece W is pushed by the spindle 220, but if the workpiece W is relatively heavy or thick, the frictional force between the workpiece W and the holding shaft 412 can increase, and the workpiece W cannot autonomously change its position and posture properly. For this reason, as a second exemplary embodiment, a linear bush 430 as a slide auxiliary tool is provided on the holding shaft 412 that holds the workpiece W. In addition, the holding shaft 412 is to be reciprocated in the axial direction so as to facilitate position and posture adjustment of the workpiece W when the front and back surfaces of the workpiece W are closely sandwiched between the measuring surface of the spindle 220 and the measuring surface of the anvil 211.

Figure 11:
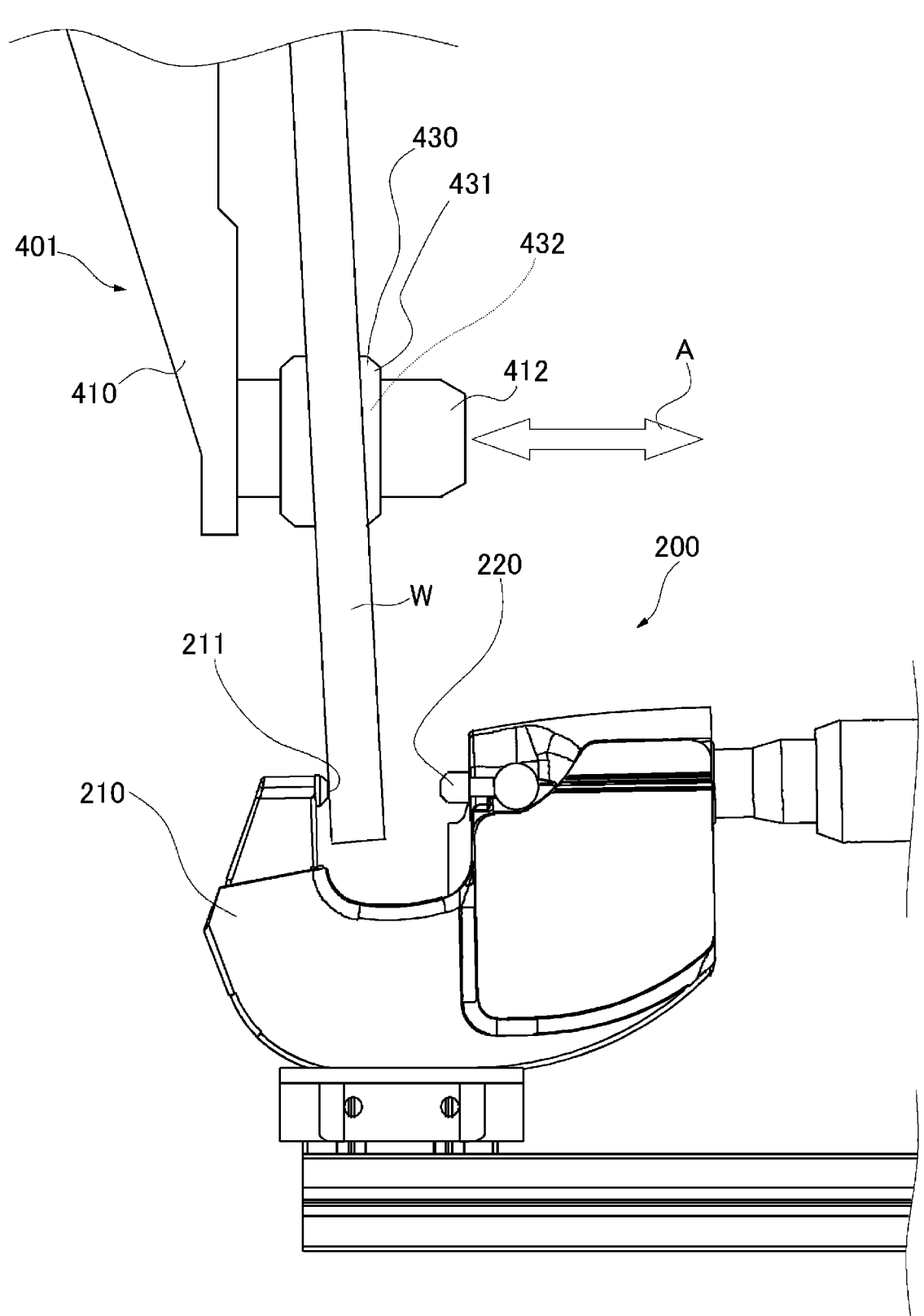
FIG. 11 is a diagram for explaining a second exemplary embodiment.

FIG. 11 is a view for explaining the second exemplary embodiment.

In FIG. 11, a workpiece holding part in the second exemplary embodiment is not provided with the second finger 420, which is the gripper opposite the first finger 410, as compared to the hand part 401 in the first exemplary embodiment. The reason why a workpiece W is not grasped by the first finger 410 and the second finger 420 is that the workpiece W is relatively heavy and is considered to be stable without wobbling under its own weight alone. Naturally, it is not excluded that the workpiece holding part (hand part 401) is provided with the second finger 420 as in the first exemplary embodiment.

The linear bush 430 is provided on the holding shaft 412. The linear bush 430 itself is known as a low-friction rolling linear guide mechanism. The linear bush 430 includes an outer cylinder part 431 and a ball bearing 432 held inside the outer cylinder part 431. When a thicker disc grinding wheel W as the workpiece W is held by the workpiece holding part, a hole in the workpiece W is hooked onto the outer cylinder part 431 of the linear bush 430 to hold the workpiece W (thicker disc grinding wheel W) with the outer cylinder part 431 of the linear bush 430.

Figure 12:
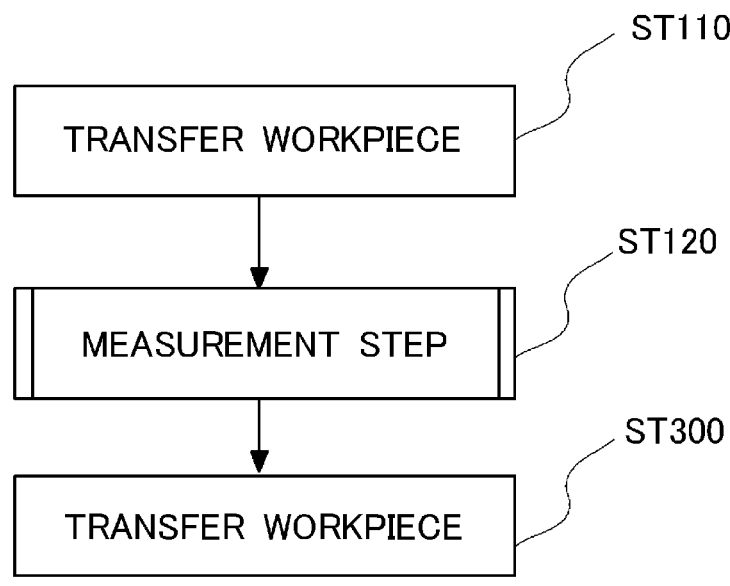
FIG. 12 is a flowchart showing a workpiece measurement operation in the second exemplary embodiment.

FIGS. 12 and 13 are flowcharts showing a workpiece measurement operation in the second exemplary embodiment.

In FIG. 12, the releasing step of opening the first finger 410 and the second finger 420 is omitted because the second finger 420 is not provided in the second exemplary embodiment.

In a measurement step in FIG. 13, steps ST210 to ST260 are the same as those described in the first exemplary embodiment.

In the second exemplary embodiment, the spindle 220 is moved forward again slowly to sandwich the disc grinding wheel W between the spindle 220 and the anvil 211 in the measuring-surface re-contact step (ST241), so that the position and inclination of the disc grinding wheel W are automatically (autonomously) adjusted. At this time, the first finger 410 (the holding shaft 412) is reciprocated in the axial direction (indicated by the arrow A in FIG. 11) (a holding-shaft driving step ST243) to facilitate sliding movement between the linear bush 430 and the holding shaft 412. This facilitates automatic (autonomous) adjustment of the position and inclination of the disc grinding wheel W by a small pressure (a force below a predetermined measurement pressure) applied from the spindle 220 to the disc grinding wheel W. Then, when it is detected that the constant pressure mechanism has been activated and that the predetermined measurement pressure has been applied to the disc grinding wheel W, the driving of the holding shaft 412 is stopped to acquire a measurement value (ST250).

Here, since the first finger 410 reciprocates the holding shaft 412 in the axial direction, the first finger 410 constitutes a holding-shaft driving means. Alternatively, it may be interpreted that the hand part 401 including the first finger 410 constitutes the holding-shaft driving means.

According to the second exemplary embodiment, it is possible to automatically (autonomously) adjust the position and inclination of the disc grinding wheel W that is a relatively heavy workpiece W and to measure the workpiece W correctly at a proper measurement pressure.

(First Modification)

Figure 14:
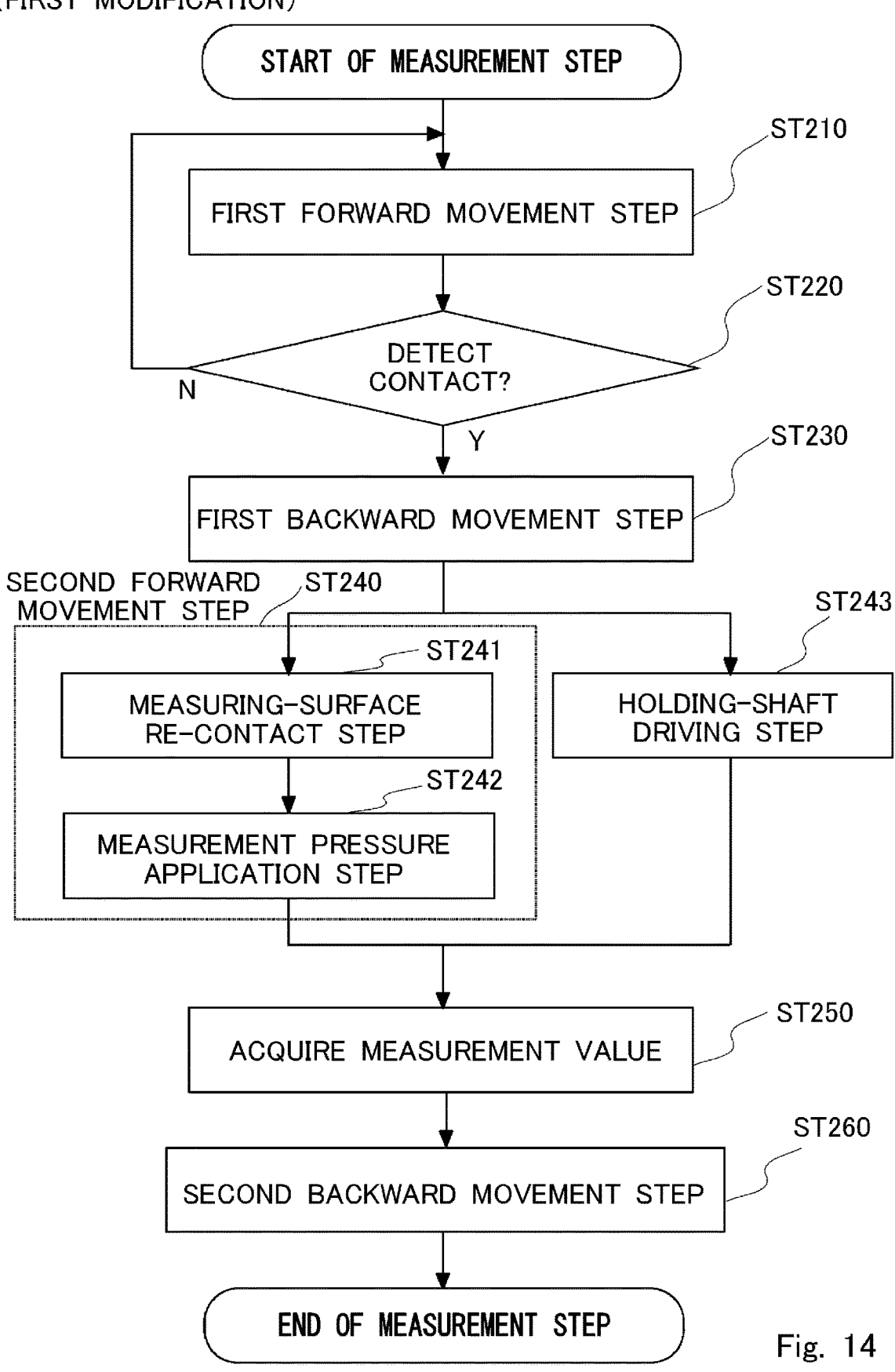
FIG. 14 is a flowchart showing a procedure of a measurement step in a first modification.

Here, the second forward movement step (ST240) can be subdivided into the step of moving the spindle 220 forward by a distance equivalent to the distance by which the spindle 220 has been moved backward in the first backward movement step (ST230) (measuring-surface re-contact step (ST241)) and the step of rotating the motor (thimble part) by an amount by which the constant pressure mechanism is activated reliably (measurement-pressure application step (ST242)). In the above second exemplary embodiment, it is assumed that the holding shaft 412 continues to be driven (reciprocated) during the second forward movement step (ST240) (the measuring-surface re-contact step and the measurement-pressure application step). As a first modification, as shown in the flowchart in FIG. 14, the holding-shaft drive step (ST243) may be performed in synchronization with the measuring-surface re-contact step (ST241), which corresponds to the first half of the second forward movement step (ST240), and the driving of the holding shaft 412 may be stopped while the constant pressure mechanism is activated to apply the measurement pressure (measurement-pressure application step ST242).

(Second Modification)

Alternatively, as shown in the flowchart in FIG. 15, the motor 310 (thimble part 230) may be rotated to activate the constant pressure mechanism for a determined number of times again just before a measurement value is acquired (ST250) while the driving of the holding shaft 412 is stopped (measurement-pressure application step ST244). The timing to stop the driving the holding shaft 412 and the timing and number of times to activate the constant pressure mechanism is to be set by comprehensively considering the weight of the workpiece W and the friction of the linear bush 430.

(Third Modification)

In the second exemplary embodiment, the holding shaft 412 is reciprocated in the measurement step to facilitate sliding movement between the linear bush 430 and the holding shaft 412. However, the reciprocating movement of the holding shaft 412 may be omitted. The reason why the reciprocating movement of the holding shaft 412 is used to facilitate the movement of the linear bush 430, that is, the movement of the workpiece W, is because dynamic friction is expected to be smaller than static friction. Therefore, if the weight of the workpiece W is not so heavy and the static friction force between the linear bush 430 and the holding shaft 412 is sufficiently smaller than the set predetermined measurement pressure, the reciprocating movement of the holding shaft 412 may be omitted.

(Fourth Modification)

In the second exemplary embodiment and first and second modifications, the holding shaft 412 is reciprocated in the axial direction. However, in a fourth modification, the holding shaft 412 may be micro-vibrated, instead of being reciprocated in the axial direction. The direction of the (micro) vibration may be a direction along the axial direction of the holding shaft 412 or a direction intersecting (orthogonal to) the axial direction. In this case, a vibration motor or the like may be provided on the holding shaft 412 or the first finger 410 as the holding-shaft driving means.

(Fifth Modification)

In the second exemplary embodiment and first to fourth modifications, the linear bush (slide auxiliary tool) 430 is provided on the holding shaft 412. However, in a fifth modification, the linear bush 430 may be omitted. That is, the workpiece W may be directly suspended on and supported by the holding shaft 412, and the holding shaft 412 (first finger 410) may be reciprocated in the axial direction or vibrated slightly. If the workpiece W is light or the thickness of the workpiece W is thin, the friction between the holding shaft 412 and the workpiece W is not so great even if the workpiece W is directly suspended on the holding shaft 412. Then, by reciprocating or micro-vibrating the holding shaft 412, it is possible to facilitate the position and posture changes of the workpiece W and close contact between the measuring surfaces of the spindle 220 and the anvil 211 and the workpiece W.

The present invention is not limited to the above embodiments, and may be modified as needed without departing from the gist.

As a measuring device, the micrometer 200 is described as an example, but a micrometer head or caliper can also be used.

If there is a hole in an object to be measured (workpiece) itself such as a disc grinding wheel, whose dimension is to be inspected and measured, the workpiece can be held by passing the holding shaft 412 through the hole in the workpiece.

Figure 16:
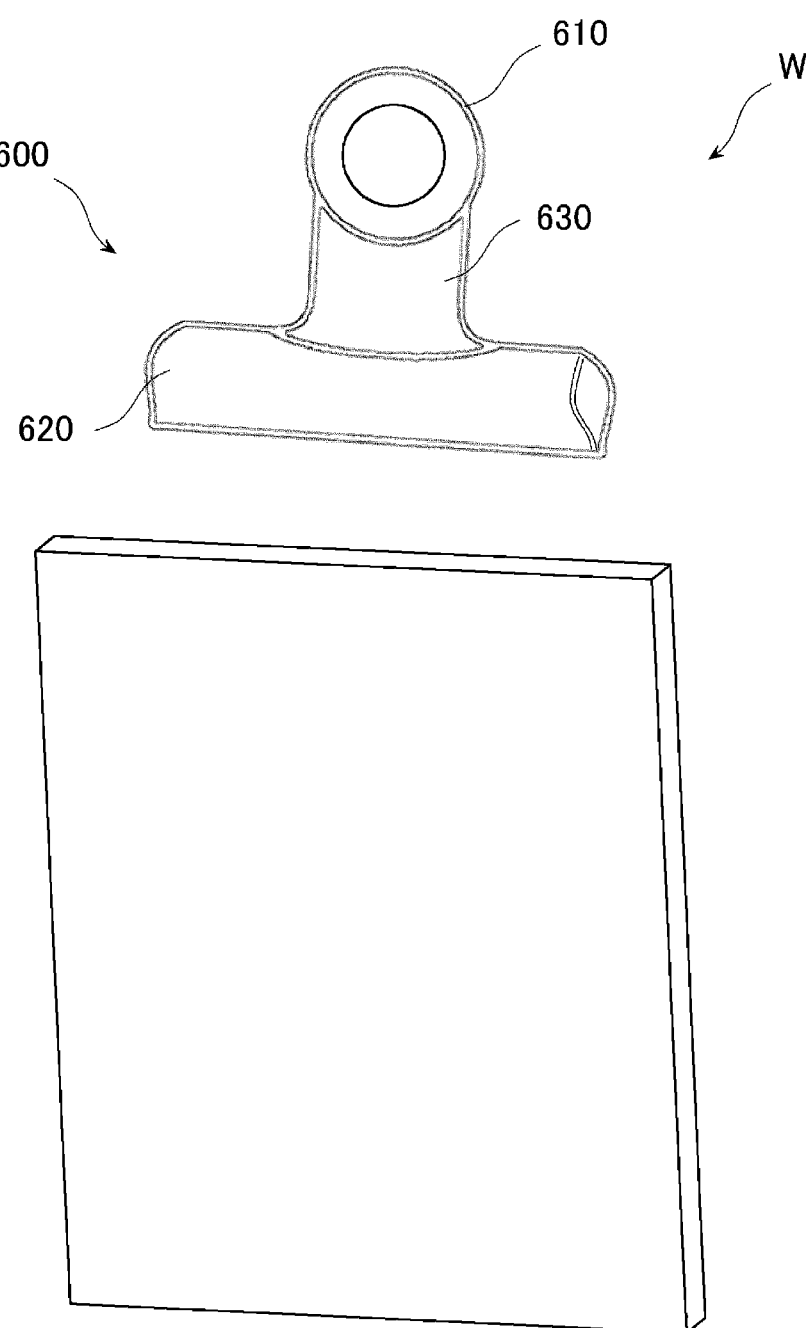
FIG. 16 is a diagram showing an example of a ring jig.

If there is no hole in an object to be measured itself whose dimension is to be inspected and measured, a ring jig 600 may be prepared and attached to the object to pass the holding shaft 412 through the hole in the ring jig 600. In this case, the jig (ring jig) 600 and the object to be measured together are regarded as the workpiece W. The ring jig 600 includes, for example, a ring part 610 at one end and a clip-like attaching part 620 at the other end, and the ring part 610 and the attaching part 620 are coupled by a coupling part 630, as shown in FIG. 16. The attaching part (clip part) 620 is attached to the edge of an object to be inspected and measured in order to add a hole (ring) for holding the object having no hole. The attaching part 620 can be a suction cup, magnet, removable adhesive material, or the like, instead of a clip.

| | |
|---|---|
| Automatic measuring apparatus | 100 |
| Automatic measuring device part (automatic micrometer part) | 110 |
| Measuring device part (micrometer) | 200 |
| U-shaped frame | 210 |
| Anvil | 211. |
| Spindle | 220 |
| Thimble part | 230 |
| Displacement detection part | 240 |
| Automatic operation part | 300 |
| Motor | 310 |
| Power transmission part | 320 |
| Fastening ring | 321 |
| Rotating plate | 322 |
| Transmission link rod | 323 |
| Robot arm part | 400 |
| Hand part | 401 |
| First finger | 410 |
| First grasping surface | 411 |
| Holding shaft | 412 |
| Second finger | 420 |
| Second grasping surface | 421 |
| Hole | 422 |
| Linear bush | 430 |
| Outer cylinder part | 431 |
| Ball bearing | 432 |
| Control unit part | 500 |
| Measurement-operation control unit | 510 |
| Drive control unit | 511 |
| Measurement-value acquisition unit | 512 |
| Robot-arm drive control unit | 520 |
| Central control unit | 530 |
| Ring jig | 600 |
| Ring part | 610 |
| Attaching part | 620 |
| Coupling part | 630 |
| Disc grinding wheel (workpiece) | W |

The invention claimed is:

1. An automatic measuring apparatus configured to automatically measure a workpiece dimension, the automatic measuring apparatus comprising:

a measuring device configured to measure the workpiece dimension by detecting displacement of a movable element configured to move forward and backward to be brought into contact with or away from a workpiece;

an automatic operation part configured to automate the forward/backward movement of the movable element by power; and a workpiece holding part configured to hold the workpiece, wherein the workpiece holding part includes a holding shaft having a length in a direction along a direction of the forward/backward movement of the movable element and is configured to hold the workpiece while the holding shaft is inserted in a hole in the workpiece and to allow the workpiece to move in parallel along the holding shaft to change a position of the workpiece and to rotate to change a posture of the workpiece in such a manner that contacting surfaces of the workpiece and the movable element are in close contact with each other when the movable element is brought into contact with the workpiece.

2. The automatic measuring apparatus according to claim 1, wherein the workpiece holding part is configured to hold the workpiece in such a manner that the workpiece is suspended on the holding shaft while the holding shaft is inserted in the hole in the workpiece.

3. The automatic measuring apparatus according to claim 1, wherein the workpiece holding part includes:

a first finger including a first grasping surface from which the holding shaft protrudes; and a second finger including a second grasping surface provided with a hole through which the holding shaft is passed, and the workpiece holding part is configured to switch, while the holding shaft is inserted in the hole in the workpiece, between a grasping state in which the workpiece is sandwiched between the first grasping surface and the second grasping surface and a suspension state in which the grasping state is released.

4. The automatic measuring apparatus according to claim 1, wherein the measuring device further includes a fixed element and is configured to acquire the workpiece dimension as a measurement value when the movable element and the fixed element are in close contact with the workpiece at a predetermined measurement pressure, and the workpiece holding part is configured, when holding the workpiece between the fixed element and the movable element of the measuring device, to hold the workpiece in such a manner that the holding shaft is passed through the hole in the workpiece and the workpiece is in contact with the fixed element.

5. The automatic measuring apparatus according to claim 1, wherein the workpiece holding part includes a slide auxiliary tool configured to slide on the holding shaft with low friction, and is configured to hold the workpiece with the slide auxiliary tool.

6. The automatic measuring apparatus according to claim 1, wherein the workpiece holding part includes a holding-shaft driving means for moving the holding shaft forward and backward in an axial direction or vibrating the holding shaft.

7. A control method for an automatic measuring apparatus, the automatic measuring apparatus comprising:

a measuring device configured to measure a workpiece dimension by detecting displacement of a movable element configured to move forward and backward to be brought into contact with or away from a workpiece;

an automatic operation part configured to automate the forward/backward movement of the movable element by power; and a workpiece holding part including a holding shaft having a length in a direction along a direction of the forward/backward movement of the movable element and configured to hold the workpiece while the holding shaft is inserted in a hole in the workpiece, the control method comprising:

moving, by the automatic operation part, the movable element forward to bring the movable element into contact with the workpiece;

allowing, by the workpiece holding part, the workpiece to move in parallel along the holding shaft to change a position of the workpiece and to rotate to change a posture of the workpiece with a pressure lower than a measurement pressure preset in the measuring device; and acquiring, by the measuring device, a measurement value when the workpiece and the movable element are in close contact and a predetermined measurement pressure is generated between the workpiece and the movable element.

* * * * *